Aug. 31, 1965     A. A. REISER     3,203,230
VIBRATION INDICATOR
Filed Sept. 21, 1962     3 Sheets-Sheet 1
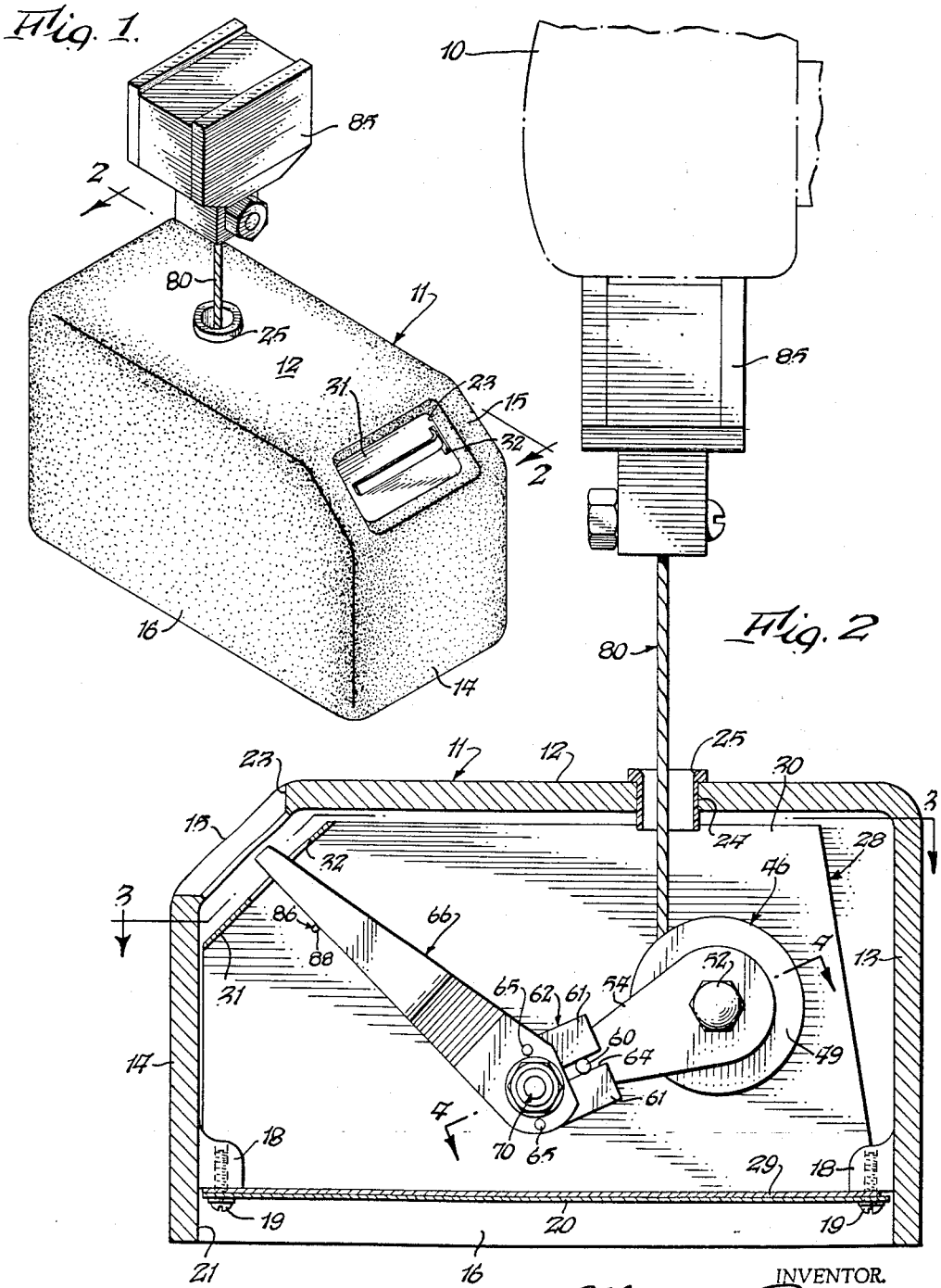
INVENTOR.
Alfred A. Reiser
BY
Popp and Sommer
ATTORNEYS.

Aug. 31, 1965

A. A. REISER 3,203,230

VIBRATION INDICATOR

Filed Sept. 21, 1962

INVENTOR.
Alfred A. Reiser
BY
Poppe and Sommer
ATTORNEYS.

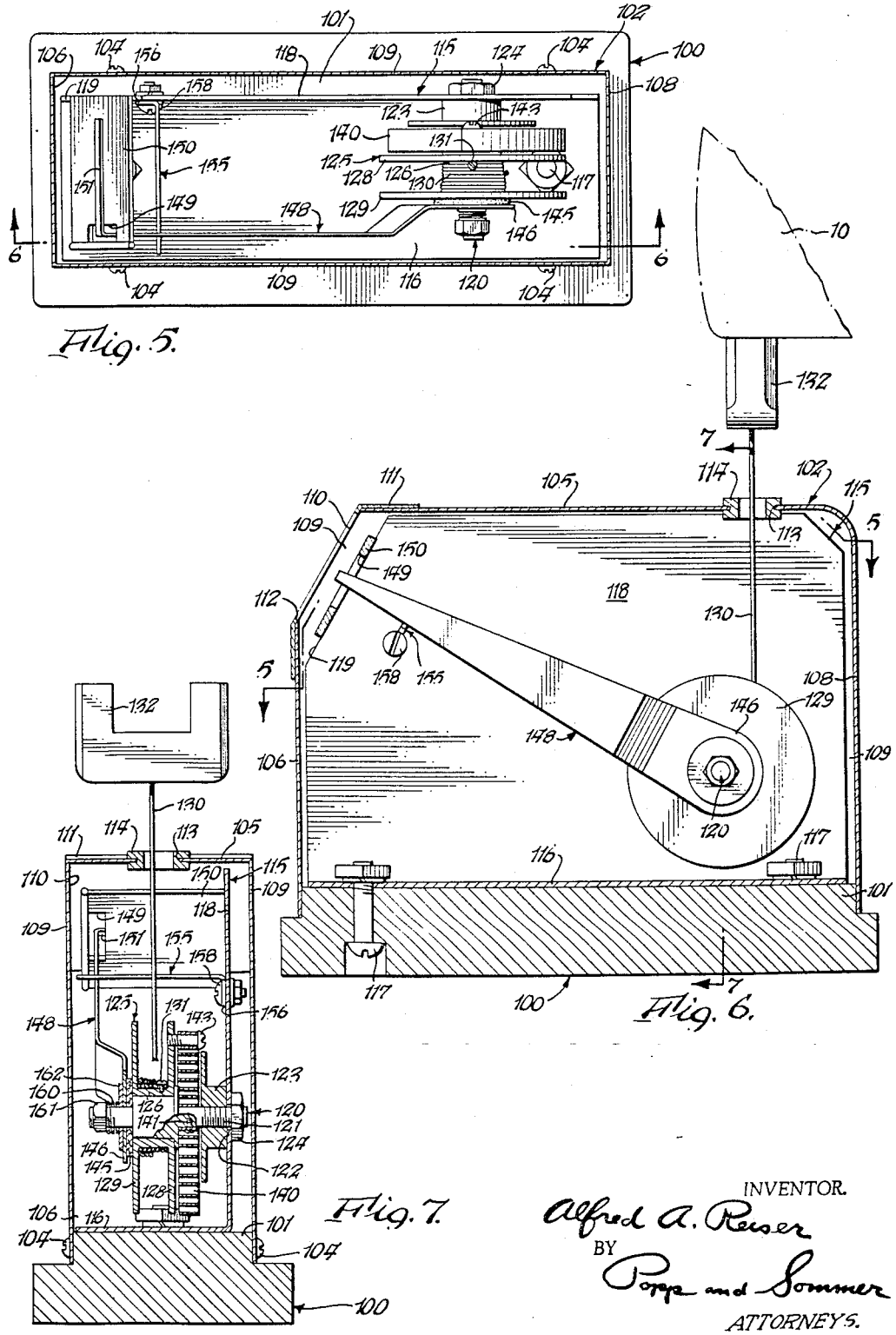

United States Patent Office 3,203,230
Patented Aug. 31, 1965

3,203,230
VIBRATION INDICATOR
Alfred A. Reiser, Old Lakeshore Road, Lake View, N.Y.
Filed Sept. 21, 1962, Ser. No. 225,179
9 Claims. (Cl. 73—70)

This invention relates to a device for indicating the degree of vibration of a part and is more particularly intended for use when balancing the rubber tired ground engaging wheels of an automobile.

During such balancing the wheel being balanced is spun at a relatively high speed and the resulting vibration due to the wheel unbalance is present to various degrees in all parts of the automobile chassis and body and to a large degree at the end of the bumper adjacent the wheel being balanced. The device of the present invention is particularly adaptable for attachment to the bumper of the vehicle to indicate the degree of vibration thereof and which is directly proportional to the amount of wheel unbalance under normal conditions.

One of the principal objects of the present invention is to provide such a vibration indicator which is readily portable and can readily be brought up to the bumper end adjacent the wheel being balanced.

Another important object of the present invention is to provide such a vibration indicator which can be quickly coupled to the bumper end, it being merely necessary to lift a permanent magnet attached to the end of a line and magnetically couple this permanent magnet with the bumper end.

A further object is to provide such a vibration indicator which has a readily readable indicator which clearly shows when the vibration of the bumper, induced by the wheel under test, comes to an end so that the operator is unmistakably apprised when he has properly balanced the wheel.

Another object of the present invention is to provide such a vibration indicator which is of simple and inexpensive construction and at the same time sturdily constructed and which will stand up under conditions of severe and constant use without getting out of order or requiring repairs.

Other objects and advantages of the invention will be apparent from the following description and drawings in which:

FIG. 1 is a perspective view of a device for indicating the degree of vibration of a body part of an automobile and embodying the present invention.

FIG. 2 is an enlarged vertical longitudinal central section, taken generally on line 2—2, FIG. 1.

FIG. 5 is a view similar to FIG. 3, showing a modified form of the invention, this view being taken on line 5—5, FIG. 6.

FIG. 6 is a vertical longitudinal section taken generally on line 6—6, FIG. 5.

FIG. 7 is a vertical transverse section taken generally on line 7—7, FIG. 6.

Figures 3, 4:
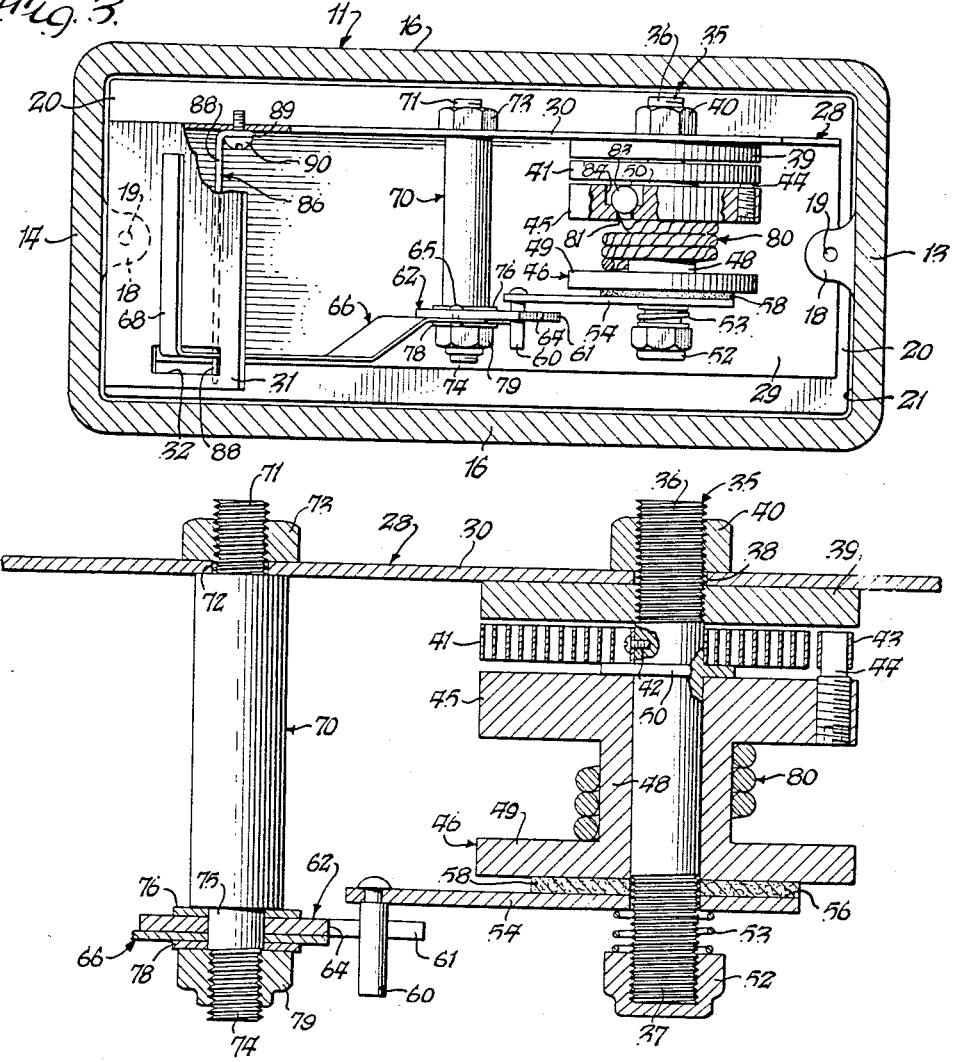
FIG. 3 is a horizontal section taken generally on line 3—3, FIG. 2.
FIG. 4 is an enlarged fragmentary sectional view taken generally on line 4—4, FIG. 2.

The two forms of vibration indicator illustrated are intended primarily for use when balancing the rubber tired wheels of an automobile. The device of the present invention is illustrated as attached to the bumper 10 of the vehicle to indicate the degree of vibration which exists at this part or component of the automobile body or chassis and which is directly proportional to the amount of unbalance of the adjacent wheel under normal conditions.

Referring to the form of the invention illustrated in FIGS. 1–4, the numeral 11 represents a casing, preferably weighted or in the form of a casting, so that when placed upon the floor and the indicator mechanism attached to the bumper end, the body 11 will not be influenced by the vibration of the bumper. This body 11 is shown as having a top wall 12, rear wall 13, front wall 14, inclined wall 15 connecting the top and front walls, and side walls 16. The bottom of the body is open but is provided internally with a plurality of lugs 18 which project horizontally inwardly and to the under sides of which is removably secured, as by screws 19, a rectangular horizontal plate 20 which encloses the open bottom 21 of the body.

The inclined wall 15 at the front of the body 11 is provided with a rectangular window 23 through which the hand or pointer of the vibration indicator can be observed and the top wall 12 is provided with a central through opening 24 containing a sleeve or grommet 25 of nylon or the like through which the line forming part of the indicating mechanism works, as hereafter described.

The indicator includes a chassis 28, preferably of sheet metal, housed within the body 11 and secured thereto by the screws 19. For this purpose, the sheet metal chassis 28 has a horizontal rectangular plate 29 which rests on the bottom plate 20 and extends under the lugs 18 to be secured by the same screws 19 which secure this bottom plate in position. Rising from one side of the bottom 29 of the chassis is a vertical side wall or member 30. Projecting horizontally from the upper front part of the side wall 30 is an upper wall 31 which is arranged below and parallel with the inclined wall 15 connecting the top and front walls 12, 14, of the body 11. This top wall 31 of the chassis 29 is provided at one side with a vertical slit 32 for a purpose which will presently appear.

The chassis 29 carries a horizontal stub shaft 35 which in turn carries certain oscillating parts of the indicating device. This stub shaft 35 is shown as having its opposite ends threaded, as indicated at 36 and 37, and the threaded end 36 extends through an opening 38 in the side wall 30 of the chassis 28. This stub shaft is secured to this side wall by means of a large internally threaded disk 39 screwed on the threads 36 and a nut 40, the side wall 30 being clamped between this threaded disk and nut as best shown in FIG. 4.

Beyond the internally threaded disk 39 the inner convolution of a spiral clock spring 41 is secured by means of a screw 42 or in any other suitable manner to the stub shaft 35, this spiral spring being made of a strip of spring metal and having the outer end 43 of its outer convolution formed to embrace a pin 44 projecting laterally from one side wall or flange 45 of a reel, drum or spool 46. This wall 45 is connected by a cylindrical hub part 48 of the reel 46 with an opposite side wall or flange 49 and the reel 46 is journaled on the unthreaded portion of the stub shaft 35 and preferably held in spaced relation to the convolutions of the spiral spring 41 by means of a spacer collar 50 which is preferably integral with the stub shaft 35 as best shown in FIG. 4.

On the threads 37 at the outboard end of the stub shaft 35 is secured a cap nut 52. A helical compression spring 53 surrounds the outboard end of the stub shaft 35 and seats against the rim of the cap nut 52. The other end of this helical compression spring 53 presses against a sheet metal arm member 54 and holds the opposite flat face 56 of this arm in frictional engagement with a felt disk or pad 58. The opposite face of this felt pad is in contact with the outside face of the side wall 49 of the reel, drum or spool 46.

A pin 60 projects horizontally from the outboard end of the friction arm member 54 generally parallel with the axis of the stub shaft 35. This pin is embraced by the jaws 61 of a short bifurcated arm 62, these jaws providing a radially extending slot 64 in which the pin 60 rides. To this short bifurcated arm 62 is secured, as by rivets 65, a hub of a sheet metal indicating arm 66 the outboard end of which projects outwardly through the slot 32 and is provided with a laterally extending hand or pointer portion 68 extending across the window 23 parallel with the top wall 31 of the chassis 28 and parallel with the wall 15 connecting the top and front walls 12, 14 of the body.

The bifurcated arm 62 and indicating arm 66 are journaled on the outboard end of a second horizontal stub shaft 70. As best shown in FIG. 4, this stub shaft is shown as having a threaded anchoring end 71 of reduced diameter extending through an opening 72 in the side wall 30 of the chassis 28 and secured to this side wall by a nut 73. The opposite or outboard end of this stub shaft is provided with an axially projecting neck 74 of reduced diameter the inboard end 75 of which is unthreaded and on which the bifurcated arm 62 and indicating arm 66 are journaled, washers 76 and 78 being arranged on opposite sides of these arms. These arms and washers are held on the unthreaded inboard end 75 of the neck 74 by a nut 79.

A flexible line 80, preferably in the form of a woven cord, has one end extending through an opening 81 in the side wall 45 of the reel, drum or spool 46 and secured therein by an enlargement 83 secured to this end of the line and arranged in an enlarged part 84 of the opening 81 on the side of the wall 45 facing the spiral spring 41. This line is wound around the hub 48 of the reel 46 and from the reel extends upwardly out of the body 11 through the nylon sleeve or grommet 25.

To the outer end of the line 80 is fastened, in any suitable manner, some means for conveniently attaching the line to the vibrating part of the vehicle, such as the bumper 10. The attaching means may for example comprise a metal hook (not shown) which may be hooked into the grill with the line draped over the bumper 10, or it may as shown herein comprise a permanent magnet 85, this magnet being of sufficient strength to cling magnetically to the underside of the bumper 10.

An important feature of the invention resides in the provision of a cantilevered centering spring 86 which yieldingly stops and holds the indicator arm 66 with its outboard hand or pointer end 68 in centered relationship to the window 23. This centering spring is shown as comprising a straight length 88 of spring wire provided with an eye 89 projecting perpendicularly therefrom and secured to the side wall 30 of the chassis 28 by a screw 90 or in any other suitable manner. The outboard end of the cantilever spring 86 engages the underside of the outboard end of the indicating arm 66 when its laterally extending visual hand or pointer end 68 is in the center of the window 23.

In the use of the vibration indicator the spiral spring 41 and line 80 are under preset tension when the permanent magnet 85 is at rest on the top wall 12 of the body 11 of the indicator.

The corner of the automobile body supported by the rubber tired wheel (not shown) is jacked up to free the rubber tired ground engaging wheel under test which is rotated at a relatively high rate of speed. Any unbalance of the rapidly rotating wheel is transmitted to the bumper 10 at the corner of the chassis. The operator places the body 11 of the indicating device under this end of the bumper and draws the attaching means, e.g., the permanent magnet 85, upwardly into contact with the bumper or other suitable part of the vehicle.

This attachment draws the line 80 outwardly thereby to turn the reel or spool 46 in releasing the convolutions of the line thereon, this turning being in the direction to increase the tension of the helical clock spring 41, the outboard convolution of which is fastened to the rim of the reel 46 and the inner convolution of which is secured to the fixed stub shaft 35. Because of the form of the spiral clock spring 41, however, this increase in the tension thereof is of unimportant value so far as the present invention is concerned, it being important, however, that this spring exert enough force on the reel 46 to hold the line 80 taut. During this rotation of the reel 46 in paying out the line 80, motion is, of course, transmitted through the felt disk 58 to the arm member 54 journaled on the stub shaft 35. Through the pin 60 at the outboard end of this arm member 54, this motion is also transmitted to the short bifurcated arm 62 and to the indicating arm 66 riveted thereto. The winding of the line 80 on the reel 46 is such that when the line is so pulled off the reel 46 the arm 54 is urged in a clockwise direction as viewed in FIG. 2 thereby to urge the arms 62 and 66 in a counterclockwise direction as viewed in this figure. Accordingly, this force tending to move these arms is restricted initially to a minor degree by the cantilever spring 86. As this spring is deflected by the arm 66 this arm will come to rest firmly against the lower edge of the slot 32. At this time with the permanent magnet 85 attached to the bumper (assumed to be at rest) the line or cord 80 will be at rest as well as the reel 46, the arm 54 and the arm 66. Under these conditions, the cantilever spring 86 will bias the arm 66 upwardly and center, or at least tend to center, the indicator end 68 of this arm centrally in the window 23.

The line 80 is now taut and the vertical components of the movement of the unbalanced wheel under test are transmitted via the bumper 10 and attaching means or permanent magnet 85 to the taut line 80 so as to vibrate it longitudinally. This causes a corresponding oscillation of the reel 46 which holds this cord under tension. This oscillatory vibration of the reel 46 is transmitted through the felt disk 58 to the arm member 54 and, via the pin 60 at the outboard end of this arm, to the bifurcated arm 62 and indicator arm 66 riveted thereto, these arms 62 and 66 being journaled on the stub shaft 70.

This causes a corresponding vibratory movement of the angularly bent pointer or hand 68 of the indicating arm 66 which pointer or hand 68 is viewed by the operator through the window 23. As the vibrations are induced into the arm 66 the cantilever spring 86 will bias the arm into a position where it will oscillate in step with the oscillatory force delivered through the line or cord 80. The mid-point of oscillation of the arm 66 and the associated angularly bent pointer or hand 68 will be very close to the free state position when at rest upon the biasing spring 86. This point is preselected to bring the pointer or hand 68 into operation in the mid-area of the window 23. The degree of amplitude of vibration or flutter of the pointer or hand 68 and the arm 66 is directly proportional to the unbalance of the wheel which is under observation.

The action of the arm 66 and the associated pointer or hand 68 in relation to the biasing spring 86 in operation of the device is dependent upon two distinct output forces developed by the clutch assembly comprised of parts 46, 58, 54, 53 and 52. As with all dry type frictional clutches these forces are commonly known as the "breakaway force" and the "slipping force." When this type of clutch is subjected to a slowly applied force in one direction an output force will be developed without relative movement of the clutch parts. As the input force is increased the output force will gradually rise to the aforementioned breakaway point. At this point the clutch will slip and the output force will drop. In view of the above clutch action it is evident that the line or cord 80 can be drawn slowly taut and the arm 66 can be made to deflect the cantilever spring 86 with the arm coming to rest upon the lower edge of the slot 32. However, when a clutch such as that described is subjected to an input force that is rapidly changing in direction rotatively the clutch will develop an output force that varies in step with the input force. At each peak of reversal of the input force the parts of the clutch will be relatively stationary and the output force of the clutch will be maximum. The clutch therefore under this condition can deflect a biasing spring substantially. As the input force to the clutch reverses there is relative movement of the clutch parts and the output force of the clutch drops. Under this condition the biasing spring can raise or restore a clutch output arm such as the arm 66 upwardly. As the arm is raised it will leave the spring and continue its upward travel in step with the clutch even though the output force of the clutch is not maximum. As the momentum of the arm expires and the clutch input force changes direction the output force of the clutch again rises to maximum and propels the arm 66 downwardly to once again meet and deflect the biasing spring and repeat the described cycle.

The operator then adjusts the tool (not shown) used in balancing the wheel so as to counterbalance its overweighted side. This wheel balancing tool can be of the form shown in my copending application, Serial No. 74,313, filed December 7, 1960, now Patent Number 3,152,481, for Hand Tool for Balancing a Rotatable Body. When the balancing tool completely balances the wheel, the vibration of the end of the bumper 10 ceases and the vibration via the taut cord 80 and reel 46 to the arms 54, 62, 66 also ceases. Accordingly, the visual hand or pointer end 68 stops its vibratory or fluttering movement and the operator knows that his balancing tool has been adjusted to counterbalance the wheel. He then stops the wheel, observes the balancing tool to ascertain the degree and location of the unbalance in the wheel, removes his balancing tool, and applies a counterweight (not shown) of the right value in position to properly balance the wheel. He then removes the permanent magnet 85 and moves the equipment to balance another wheel of the vehicle.

It will be seen that the invention comprises a support 28 adapted to be manually moved from place to place; indicating means in the form of the reel 46 journaled on the support, pointer means in the form of the arm member 54 and arm member 66, 68 and friction clutch means 58 normally connecting the reel 46 and arm member 54; extensible means in the form of the line 80 connected to the reel 46; and attaching means in the form of the permanent magnet 85 for connecting the line 80 with the part under test. It will further be seen that means in the form of the clockspring 41 biases the reel 46 to hold the line 80 taut and that the cantilever spring 86 normally biases the pointer means 54, 66, 68 to a predetermined position and has a strength insufficient to interfere with rapid oscillation of the pointer means 54, 66, 68 but sufficient normally to center the pointer when the line, reel and clutch are at rest.

The form of the invention shown in FIGS. 5–7, represents a simplification of the form of the invention shown in FIGS. 1–4, the hub of the indicating arm being concentric with the spool and coupled frictionally directly therewith as contrasted to the interposed motion magnifying short bifurcated arm 62 in the form of the invention shown in FIGS. 1–4. This renders the indicating device shown in FIGS. 5–7 less sensitive than the device shown in FIGS. 1–4 but of similar construction.

The vibration indicator shown in FIGS. 5–7, comprises a relatively heavy base 100 which can be made of cast metal and which is shown as being generally rectangular in plan with a central rectangular elevated portion 101. An open bottomed sheet metal casing 102 has its bottom rim fitting around the rim of this elevated central portion 101 and secured thereto, as by screws 104. This sheet metal case 102 has a top wall 105, front wall 106, rear wall 108, and side walls 109. The front end of the top wall 105, top of the front wall 106 and corresponding parts of the upper front corners of the side walls 109 are cut away to leave an inclined opening 110 at the upper front corners of the case. This opening is provided with a suitable sheet metal cover or bezel 111, the center of which is cut away to provide a rectangular window 112.

As with the form of the invention shown in FIGS. 1–4, the top wall 105 of the casing 102 is provided toward its rear end with a central opening 113 containing a vertical nylon sleeve or grommet 114.

The base 100 supports a chassis 115 which can be made of sheet metal and is shown as having a horizontal bottom 116 secured to the base as by bolts 117 and as having an upstanding side wall or support member 118 arranged adjacent one of the side walls 109 of the case. The upper front corner of this side wall 118 is cut away to provide an inclined edge 119 which is parallel with the opening 110. This side wall or upstanding member 118 of the chassis supports a stub shaft 120 one end of which is threaded, as indicated at 121, and extends through an opening 122 in the upstanding wall 118. To support the stub shaft 120, the upstanding side wall 118 is clamped between the hub of an internally threaded disk 123 and a nut 124 both of which are screwed on the threaded end 121 of the stub shaft.

A reel 125 is journaled on the stub shaft 120, this reel having a hub 126 and radially extending side walls or flanges 128, 129 projecting from the ends of this hub. A line 130, preferably in the form of a cord, has one end wound around and suitably attached to the hub 126 of the reel 125, as by the screws 131. The other end of this line extends upwardly through the grommet 114 and has attached thereto a suitable attaching means such as a hook or a permanent magnet 132. This magnet is adapted to be magnetically attached to the underside of one end of the bumper 10 of the automobile in the same manner as with the form of the invention shown in FIGS. 1–4. A spiral clock spring 140 is interposed between the side wall or flange 128 of the reel 125 and the fixed disk 123. The inner convolution of this spring is fixed to the stub shaft 120 as by a screw 141. The outer convolution of this spring is secured to the rim of the side wall or flange 128 of the reel 125 as by a screw 143. This spring is prestressed or biased so as to turn the reel 125 in the direction to wind the line 130 thereon, thus biasing the line to be drawn into the casing 102 with the permanent magnet 132 seated on the top wall thereof.

A felt clutch disk 145 is disposed against the outer face of the side wall or flange 129 of the reel 125 and the opposite face of this felt disk is frictionally engaged by the hub member 146 of an indicating arm 148 the outer extremity of which projects through a vertical slot 149 in a rectangular background plate 150 one end of which is secured to the inclined forward top edge 119 of the side wall 118 of the chassis 115. In front of this background plate 150 the indicating arm 148 is provided with a laterally extending horizontal pointer or hand end 151 which is readily visible.

As with the form of the invention as shown in FIGS. 1–4, the indicating arm 148 is held in predetermined position so that the laterally extending hand or pointer end 151 thereof is always in generally centered relation to the background plate 150. For this purpose, a cantilever spring finger 155 is in the path of and supports the edge of the indicating arm 148. The spring finger is in the form of a horizontal wire with a vertical eye 156 formed at one end thereof and secured by a screw 158 to the vertical side wall 118 of the chassis 115. The friction clutch provided by the reel 125, hub member 146 of the indicating arm 148 and felt pad 145 is spring loaded by a helical compression spring 160 interposed between a nut 161 on the outboard end of the stub shaft 120 and a washer 162 against the face of the hub member 146.

It will be seen that the operation of the form of the invention shown in FIGS. 5–7 generally follows the operation of the form of the invention shown in FIGS. 1–4. Thus, after jacking up one corner of the auto and rotating the wheel to be balanced rapidly, the operator slides the vibration indicator under the adjacent end of the bumper 10, and attaches the permanent magnet 132 to the bumper 10, thus drawing the line 130 taut. He then applies his conventional wheel balancing tool (not shown) to the wheel to be balanced. As the unbalanced wheel rotates, it vibrates the bumper end 10 vertically thereby raising and lowering the attached vertical end of the cord 130 secured thereto by the permanent magnet 132. This causes oscillatory vibration of the reel 125 which is frictionally transmitted through the felt clutch pad 145 to the hub member 146 of the indicating arm 148 thereby to cause the outer laterally bent hand or pointer 151 of this arm to vibrate or flutter vertically in view of the operator.

The operator then adjusts his wheel balancing tool (not shown) so as to counterbalance the unbalanced side of the wheel under test and as he does so the vibration of the bumper 10, and hence the outer pointer or hand end 151 of the indicating arm 148 diminishes to zero.

When the zero point is reached the operator stops the wheel, observes from the balancing tool both the amount and the point of unbalance of the wheel under test, removes the tool and applies the proper counterweight. He then removes the tools to the next wheel to be balanced.

From the foregoing, it will be seen in the present invention a very simple and reliable vibration indicator is provided which can be quickly applied to an automobile body to indicate the degree of unbalance of an unbalanced wheel and at the same time provides a very accurate indication when vibrations induced by the wheel being balanced cease.

I claim:

1. A device for indicating the vibration of a part, comprising a stationary support, a reel journaled on said support, a spring biasing said reel to rotate in one direction, a flexible line having one end connected with and wound up on said reel, mean connecting the other end of said line to said part, pointer means on said support and clutch means normally coupling said pointer means to said reel for conjoint oscillation therewith but accommodating relative rotative movement between said reel and pointer means.

2. A device as set forth in claim 1 wherein spring means normally bias said pointer means to a predetermined position.

3. A device as set forth in claim 2 wherein means limit the movement of said pointer means by said clutch means following movement of said pointer means from said predetermined position against the resistance of said spring means, whereby subsequent vibration of said pointer means causes said spring means to return said pointer means toward said predetermined position.

4. A device as set forth in claim 1 wherein said connecting means is a magnet.

5. A device for indicating the amplitude of vibration of a part, comprising a support, a reel journaled on said support, a line having one end attached to and wound around said reel, means removably attaching the other end of said line to said part, means biasing said reel in the direction to wind up said line thereon and to maintain said other end of said line taut, indicating means, means limiting the movement of said indicating means, and means including a slipping clutch operatively connecting said indicating means through said biasing means with said reel whereby said indicating mean is actuated in response to the vibration of said taut line and said reel induced by the vibration of said part and said slipping clutch becomes operative when said indicating means is stopped by said limiting means.

6. A device for indicating the amplitude of vibration of a part, comprising a support, a reel journaled on said support, a line having one end attached to and wound around said reel, means removably attaching the other end of said line to said part, means biasing said reel in the direction to wind up said line thereon and to maintain said other end of said line taut, and indicating means actuated in response to the vibration of said taut line and said reel induced by the vibration of said part, comprising a member frictionally connected with said reel to rotate therewith to the extent of the friction drive therebetween, and an indicating arm connected with said member, the vibration of said indicating arm indicating the state of vibration of the part under test.

7. A device for indicating the amplitude of vibration of a part, comprising a support, a reel journaled on said support, a line having one end attached to and wound around said reel, means removably attaching the other end of said line to said part, means biasing said reel in the direction to wind up said line thereon and to maintain said other end of said line taut, indicating means actuated in response to the vibration of said taut line and said reel induced by the vibration of said part, and means yieldingly holding said indicating means in a predetermined position.

8. A device for indicating the amplitude of vibration of a part, comprising a portable support including a chassis having an upstanding member, a generally horizontal shaft fixed to said member, a spool journaled on said shaft, a line having one end attached to and wound around said spool, means removably attaching the other end of said line to said part, a spiral spring having its inner convolution connected to said shaft and its outer convolution connected to the rim of said spool and biasing said spool in the direction to wind up said line thereon and to maintain said other end of said line taut, a member on the side of said spool remote from said spring, means on said shaft biasing said last mentioned member along said shaft toward said spool to have predetermined frictional connection with said spool to normally rotate therewith, and indicating means actuated in response to the vibration of said taut line and said spool induced by the vibration of said part.

9. A device as set forth in claim 8 wherein means yieldingly hold said indicating means in a predetermined position.

References Cited by the Examiner

UNITED STATES PATENTS

| | | | |
|---|---|---|---|
| 1,522,986 | 1/25 | Taylor | 73—70 X |
| 2,383,405 | 8/45 | Merrill et al. | 73—457 |
| 2,777,327 | 1/57 | MacMillan | 73—70 X |

RICHARD C. QUEISSER, *Primary Examiner.*

JOSEPH P. STRIZAK, *Examiner.*